United States Patent
Hamlin

(10) Patent No.: US 11,748,481 B1
(45) Date of Patent: *Sep. 5, 2023

(54) VERIFYING THE INTEGRITY OF A COMPUTING PLATFORM

(71) Applicant: Christopher Luis Hamlin, The Sea Ranch, CA (US)

(72) Inventor: Christopher Luis Hamlin, The Sea Ranch, CA (US)

(73) Assignee: Christopher Luis Hamlin, Sea Ranch, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/526,419

(22) Filed: Nov. 15, 2021

Related U.S. Application Data

(63) Continuation-in-part of application No. 16/653,006, filed on Oct. 15, 2019, now Pat. No. 11,188,653, which is a continuation of application No. 16/224,545, filed on Dec. 18, 2018, now Pat. No. 10,482,251, which is a continuation of application No. 15/831,233, filed on Dec. 4, 2017, now Pat. No. 10,185,827, which is a continuation-in-part of application No. 15/357,852, filed on Nov. 21, 2016, now Pat. No. 9,836,611, which is a continuation of application No. 15/087,822, filed on Mar. 31, 2016, now Pat. No. 9,530,002.

(60) Provisional application No. 62/511,867, filed on May 26, 2017, provisional application No. 62/283,240, filed on Aug. 26, 2015.

(51) Int. Cl.
G06F 21/57 (2013.01)

(52) U.S. Cl.
CPC ........ *G06F 21/57* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 9,530,002 B1 * | 12/2016 | Hamlin | ................ | G06F 21/577 |
| 9,836,611 B1 * | 12/2017 | Hamlin | ................ | G06F 21/57 |
| 10,185,827 B1 * | 1/2019 | Hamlin | ................ | G06F 21/57 |
| 10,482,251 B1 * | 11/2019 | Hamlin | ................ | G06F 21/57 |
| 11,188,653 B1 * | 11/2021 | Hamlin | ................ | G06F 21/57 |

(Continued)

*Primary Examiner* — Kaveh Abrishamkar
(74) *Attorney, Agent, or Firm* — Park, Vaughan, Fleming & Dowler LLP; Laxman Sahasrabuddhe

(57) ABSTRACT

At least a portion of a software image may be executed on a first instance of a computing platform. A first sequence of multi-dimensional execution states may be measured that the first instance of the computing platform passes through when executing the portion of the software image. The portion of the software image may then be executed on a second instance of the computing platform. A second sequence of multi-dimensional execution states may be measured that the second instance of the computing platform passes through when executing the portion of the software image. The integrity of the second instance of the computing platform may be verified with respect to the first instance of the computing platform by comparing the first sequence of multi-dimensional execution states with the second sequence of multi-dimensional execution states.

18 Claims, 7 Drawing Sheets

(56) References Cited

U.S. PATENT DOCUMENTS

| | | | | |
|---|---|---|---|---|
| 2010/0281273 | A1* | 11/2010 | Lee | G06F 21/72 |
| | | | | 713/193 |
| 2012/0266231 | A1* | 10/2012 | Spiers | H04L 9/3234 |
| | | | | 726/12 |
| 2014/0283062 | A1* | 9/2014 | Kamthe | H04L 63/1425 |
| | | | | 726/23 |
| 2017/0277898 | A1* | 9/2017 | Powell | G06F 21/53 |

* cited by examiner

US 11,748,481 B1

VERIFYING THE INTEGRITY OF A COMPUTING PLATFORM

RELATED APPLICATION

This application is a continuation-in-part of pending U.S. patent application Ser. No. 16/653,006, filed on 15 Oct. 2019. U.S. patent application Ser. No. 16/653,006 is a continuation of U.S. patent application Ser. No. 16/224,545 (U.S. Pat. No. 10,482,251), filed on 18 Dec. 2018. U.S. patent application Ser. No. 16/224,545 is a continuation of U.S. patent application Ser. No. 15/831,233 (U.S. Pat. No. 10,185,827), filed on 4 Dec. 2017. U.S. patent application Ser. No. 15/831,233 claims benefit of U.S. Provisional Application No. 62/511,867, filed on 26 May 2017. U.S. patent Ser. No. 15/831,233 is a continuation-in-part of U.S. patent application Ser. No. 15/357,852 (U.S. Pat. No. 9,836,611), filed on 21 Nov. 2016. U.S. patent application Ser. No. 15/357,852 is a continuation of U.S. patent application Ser. No. 15/087,822 (U.S. Pat. No. 9,530,002), filed on 31 Mar. 2016. U.S. patent application Ser. No. 15/087,822 claims benefit of U.S. Provisional Application No. 62/283,240, filed on 26 Aug. 2015. The contents of each of the above-mentioned applications are herein incorporated by reference in their entirety for all purposes.

BACKGROUND

Technical Field

This disclosure relates to computer security. More specifically, this disclosure relates to verifying the integrity of a computing platform.

Related Art

Consider a computer code that conforms in every respect to the design intentions motivating its development; call such a code uncontaminated. One path adopted by adversaries wishing to modify or interfere with the intended operation of the uncontaminated code is to introduce surreptitiously either alternative or additional computer instructions into the execution space of the code, which subvert or alter the function or outcome of the code's execution. It is therefore desirable to provide means by which the integrity or intactness of the uncontaminated code may be verified so as to provide assurance that its operation and results conform to the outcomes intended by its design.

One common method employed to achieve this is to measure the code against a known valid criterion; an example would be the well-known use of Trusted Platform Module (TPM) hardware for code measurement. One of the main uses of TPM is to assure the integrity of a platform. Specifically, the Basic Input/Output System (BIOS) and the operating system (OS) of a computing platform use TPM to assure the integrity of the computing platform.

TPM-based solutions for verifying the integrity of a computing platform have at least two serious drawbacks. First, these solutions require the presence of TPM (or equivalent) hardware in the computing platform. Second, these solutions require a correct implementation of the TPM-based security architecture within the computing platform. Unfortunately, this means that billions of existing systems are excluded from the ability to measure securely the integrity of their computer codes, because lacking correctly implemented, or any, hardware security features, they are subject to penetration by a malicious adversarial software entity such as a malicious hypervisor.

SUMMARY

Embodiments described herein provide techniques and systems to verify the integrity of an instance of a computing platform. In some embodiments described herein, at least a portion of a software image may be executed on a first instance of a computing platform. A first sequence of multi-dimensional execution states may be measured that the first instance of the computing platform passes through when executing the portion of the software image. The portion of the software image may then be executed on a second instance of the computing platform. A second sequence of multi-dimensional execution states may be measured that the second instance of the computing platform passes through when executing the portion of the software image. The integrity of the second instance of the computing platform may be verified with respect to the first instance of the computing platform by comparing the first sequence of multi-dimensional execution states with the second sequence of multi-dimensional execution states.

In some embodiments, each multi-dimensional execution state includes self-referential measurements along a number dimension, a time dimension, and a space dimension. In some embodiments, the first sequence of multi-dimensional execution states may be stored in the software image.

In some embodiments, an action may be performed at the second instance of the computing platform based on verifying the integrity of the second instance of the computing platform. The action may include, but is not limited to, resetting the second instance of the computing platform to a secure state, and activating software code embedded in the software image.

DETAILED DESCRIPTION

Figure 1:
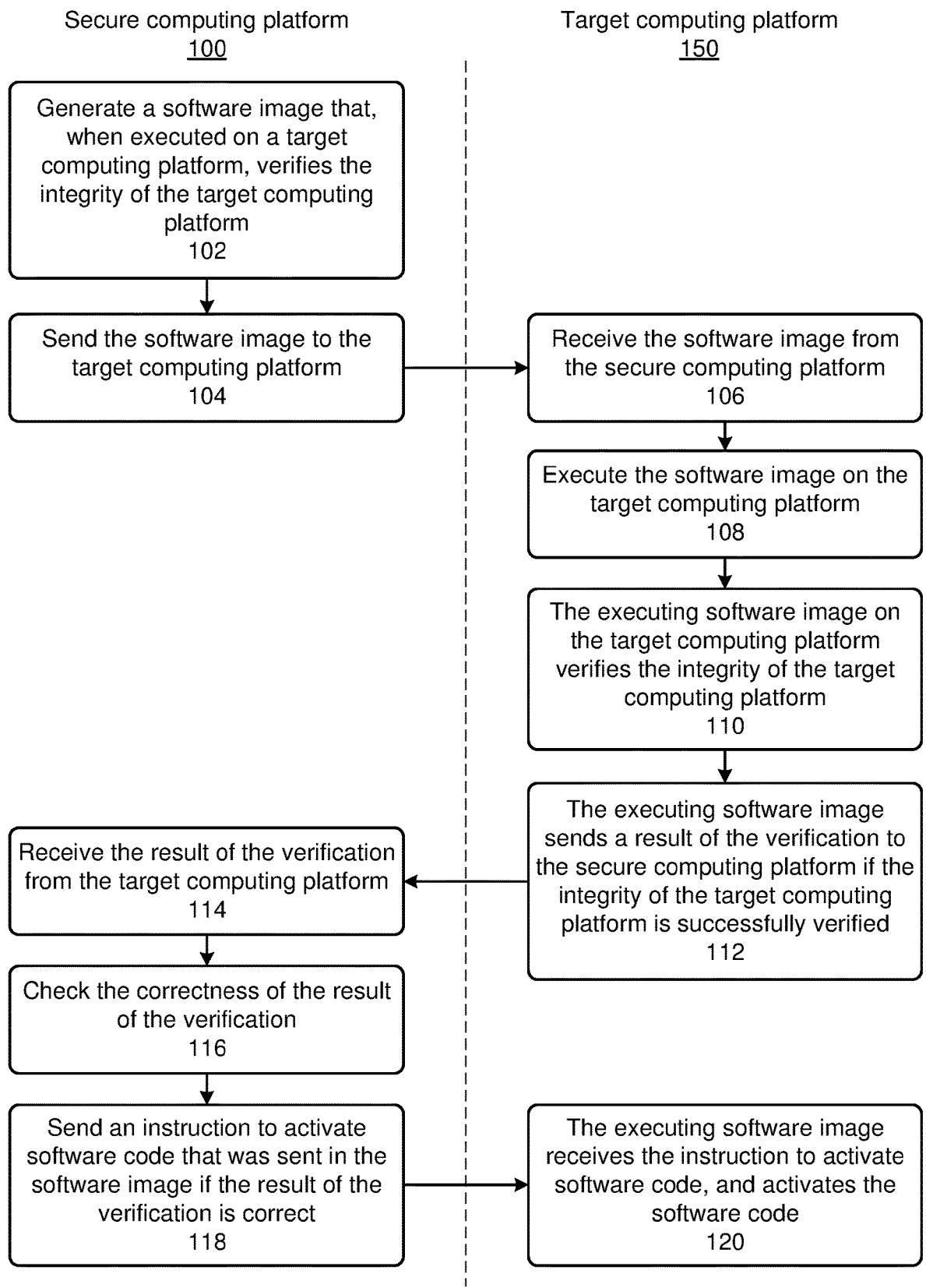
FIG. 1 illustrates a process for verifying the integrity of a computing platform in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following embodiments: (1) only X; (2) only Y; (3) only Z; (4) X and Y; (5) X and Z; (6) Y and Z; and (7) X, Y, and Z.

Overview

Some embodiments described herein provide methods and apparatuses for securing the correct operation of computer code and data in the face of adversarial attempts to corrupt, infiltrate, subvert, or disrupt the behavior of code and data from that intended by the legitimate deployment of such assets. Specifically, embodiments described herein provide secure execution of computer instructions and procedures within possibly insecure environments. These embodiments can protect against the most severe attacks launched by adversaries with state-level resources. As a proxy for the class of threats against which embodiments described herein must defend, a model of a malicious hypervisor is advanced by way of illustrating a near-worst-case scenario.

This disclosure uses certain terms when describing the embodiments for verifying the integrity of a computing platform. Some of these terms are now discussed. According to one definition, a computing platform, or a computing environment (or an environment for short) is any system or mechanism that is capable of performing computations. A computing platform always includes hardware but can also include software. For example, a computing platform can include an integrated circuit that is capable of executing instructions. The instructions and optionally data can be stored in a memory system that provides an addressable memory space to the integrated circuit. The memory system itself can comprise multiple hardware and software components, e.g., memory controllers, caches, memory chips, disk drives, memory management software code, etc. The computing platform can optionally include a software layer (e.g., a BIOS and/or an OS) that is stored in the memory system, and that provides a standardized computing interface for use by software applications. Examples of computing platforms include, but are not limited to, a smartphone, a handheld computer, a laptop computer, a desktop computer, a printer, an appliance, a virtual machine executing on a computer, etc.

According to one definition, a network is a set of one or more interconnected devices that is capable of delivering information from one computer to another computer. Examples of networks include, but are not limited to, wireless and wired networks, local area networks (LANs), metropolitan area networks (MANs), wide area networks (WANs), private networks, public networks, intranets, internets, subnets, etc.

Communication between two nodes of a network is typically accomplished using a layered software architecture, which is often referred to as a networking software stack or simply a networking stack. As is true of any data processing function, a given functionality in a networking stack can be implemented using hardware or software or a combination thereof. The decision to implement a specific functionality in hardware or software is typically based on a tradeoff between performance and cost.

A secure environment, or a secure instance of a computing platform can be defined as one that is essentially impossible for an adversary to penetrate or subvert. Examples would be a computer system in a military installation that is intended for strategic control operations, or a computer in a major financial institution's funds transfer data center. Another example, which is on a different scale than the two described above, might be a mobile device protected by TPM.

A computing platform or a computation performed by a computing platform can correspond to a state space. When a computing platform is initialized (e.g., turned on), the computing platform may correspond to an initial state in the state space. The state corresponding to the computing platform can change whenever any computing activity occurs, e.g., inputs are provided to the computing platform, computation is performed by the computing platform, or outputs are produced by the computing platform. Therefore, when a computing platform executes code, one can consider the computing platform to be moving through a sequence of states in the state space. In this state space view of the computing platform, an adversarial attack on the computing platform corresponds to a deviation from a normal sequence of states that the computing platform is expected to take in the state space. Some embodiments verify the integrity or intactness of a computing platform by determining whether or not the computing platform is moving through the normal or expected sequence of states.

There are thousands upon thousands of techniques for penetrating or subverting systems and computer codes. Some embodiments described herein are intended to serve two purposes: (1) to verify that a particular computing platform or environment (a state space) is uncontaminated (i.e., has not been corrupted, modified, or subverted), and (2) to allow such a space to be restored to a known uncontaminated state upon command if found to have been subverted or maliciously altered.

Specifically, some embodiments described herein transport operational computer code (or a state space) from a secure environment to an environment that is not known to be secure and must therefore be assumed insecure, and to install it in the target environment so that it may begin operation in the knowledge that its integrity is intact. This means that the code installed in the target space perfectly reflects its condition as it existed within the secure environment from which it was extracted and transported. An example would be a secure data center from which a code image was copied, and then securely installed on a mobile computing device like a laptop computer or a smartphone. These embodiments ensure that the image as installed on the target environment has not been corrupted, notwithstanding that the target environment may very well be infected with malicious code of unknown characteristics. An attacker will attempt to attack a computing platform by introducing alien code and data into the address and state space of the uncontaminated code, or perhaps to delete portions of the original contents. Embodiments described herein render it difficult, if not impossible, for an attacker to accomplish such attacks without detection. The degree of adversarial effort defended against can be made an adjustable parameter in these embodiments.

Some embodiments can operate as follows. First, the uncontaminated code can be read one byte or instruction at a time in a secure computing platform or environment. The target computing platform or environment (i.e., the computing platform or environment where the uncontaminated code is to be installed) can be represented within the secure environment by an abstract model of its exact hardware, memory, timing, clock type (e.g., spread spectrum), and computational and input/output composition, among other features. This abstract model is called the target template. The exact number of clock cycles at the given operating frequency for each instruction can be calculated from a table included as part of the target template. The values and totals for each execution parameter can be computed: total cycles, absolute starting time, absolute ending time (as reported via, for example, Secure Network Time Protocol (NTP)), possibly GPS parameters, and computer instructions, among other values.

A data structure can be populated with the execution parameters, and the embodiments can then encrypt the data structure into which the execution parameters were populated. A number of encryption techniques, such as streaming, block, symmetric, asymmetric, etc., are known in the art. In general, the embodiments can use any encryption technique that is appropriate for a given use case. Next, the number of cycles and instructions required to encrypt and/or decrypt the data structure is itself encrypted and incorporated in the code structure, together with other relevant values and parameters. The final software image incorporating code, time, cycles, ciphertext, etc., can then be conveyed, possibly over insecure channels, to the target computing platform. When received at the target computing platform, the image can be executed by jumping to its first executable location (which has been programmed before transmission to the target computing platform) at the predetermined time encoded in the image when it was prepared in the secure computing platform. The decryption process (which is performed by the software image that was sent to the target computing platform) unpacks the executable codes, and records the cycles, code integrity, and timing associated with the decryption process.

If and only if the cycles and timing associated with the decryption process conform to the requirements (which were computed and retained in the secure environment) of the target system's computing platform, the result of the unpacking is transmitted in encrypted form back to the secure environment in order to verify that an uncontaminated instantiation has successfully been transported to the target computing system. The secure computing platform can then check the time, and verify that the values of the associated parameters (cycle count, absolute time, checksums, GPS, and so on) conform to the requirements established when the image was initially constructed in the secure environment. If this criterion is met, the secure environment can signal through a suitable secure message, which is pertinent only to the software image on the target computing system, that the contents of the address space of the target computing platform into which the software image was installed is now suitable for execution, and the code (which is included in the software image) may be made active.

Here's why these embodiments can verify the integrity of the target computing platform: if an adversary attempts to interfere with the installation of the code on the target environment, the attempt will necessarily disrupt the deterministic relationship between the content of the code, the cycle count, the instruction count, the absolute time, and the encryption of these; these values are uniquely interdependent (are self-referential) such that none may be altered without inducing a detectable change in the others. If any attempt at alteration has taken place, it will be reported to, and/or detected by, the secure environment, whereupon any of several types of response may be mobilized depending upon requirements and conditions: repair, invalidation, forensic analysis, audit trail preparation, and so on.

As explained above, some embodiments enable a secure environment to introduce uncontaminated code into the target environment, where it may serve as an application, communicate with other applications, verify the integrity of the environment, and/or report back. It might be thought that unmodifiable firmware, perhaps with checksums, in the target could confer the same properties as the embodiments described in this disclosure. This is not so, however, because of the requirement that the protection be effective against malicious intervention with the capability of modifying code in the execution pathway; the malicious hypervisor alluded to above, examples of which are known in current cybersecurity literature, is an example of such a threat.

Only by means of the self-referential mechanism described in this disclosure can such malicious attacks be detected and prevented. Note that the secure environment may be any system deemed secure within the terms of the intended application: it might even be a mobile device protected by a properly implemented TPM. Also note that the security properties of the software image that is sent to the target environment may be ascribed to an otherwise insecure target environment, so long as the software image is validated as to its integrity using the mechanisms described in this disclosure, on an as-needed basis. Thus, networks and meshes with security properties that are verifiable on demand may be constructed from devices and images stemming from an originating secure environment.

Some embodiments described herein provide methods and apparatuses for building the software image within the secure environment, as well as the design and implementation of the target template, which dictates the parameter values employed in constructing the image. In summary, values of any of several parameters relating to time, frequency, cycle counts, addresses, authentication, and functions may be incorporated within the software image, including the values of the parameters associated with the actual encryption or decryption operations themselves. The reason for including these parameter values is to render impractical interference with or modification of the decryption and decoding process applied to the image when it has been installed on a target: the act of discovering a valid intervention or modification would in itself entail altering the timing and instruction definitions that are encoded within the image. The report back to the secure environment would therefore instantly be recognized as counterfeit when it is compared to the template prepared at the time the image was initially generated in the secure environment prior to shipping it to the target environment.

Notice that this process of including parameter values in the software image (as described above) may be applied recursively (that is, shells within shells may harbor distinct encryption and temporal code signatures, which may be independent of one another or dependent upon one another in ways stemming from the characteristics of the specific application or use case). In either event the adversary is confronted with the near impossibility of interacting with the decoding process, or of altering the content and its state space, without betraying the fact of attempted interference.

Furthermore, embodiments described herein may be employed to create validation and authentication services originating from and controlled by the secure environment (s), which may scrutinize the operation and integrity of target environments at any time, on either a random or a scheduled basis. Random testing of target environments provides a powerful tool for inhibiting and removing malicious threats. Moreover, the frequency and intensity of probes and tests may be modulated from the secure environment(s) in adaptive response to the severity and risk exposure represented by detected intrusions. Some embodiments for verifying the integrity of a computing platform are now described.

Verifying the Integrity of a Computing Platform

FIG. 1 illustrates a process for verifying the integrity of a computing platform in accordance with some embodiments described herein. Secure computing platform 100 and target computing platform 150 can communicate over a network. The process can begin by generating a software image that, when executed on a target computing platform, verifies the integrity of the target computing platform (operation 102). Next, secure computing platform 100 can send the software image to target computing platform 150 (operation 104), and target computing platform 150 can receive the software image (operation 106). Next, the software image can be executed on the target computing platform 150 (operation 108). The executing software image on the target computing platform can then verify the integrity of the target computing platform (operation 110). Next, the executing software image can send a result of the verification to the secure computing platform if the integrity of the target computing platform is successfully verified (operation 112), and the result of the verification can be received by the secure computing platform 100 (operation 114). The correctness of the result of the verification can then be checked (operation 116), and an instruction to activate software code that was sent in the software image can be sent if the result of the verification is correct (operation 118). Next, the executing software image on the target computing platform 150 can receive the instruction to activate software code, and activate the software code (operation 120).

Figure 2A:
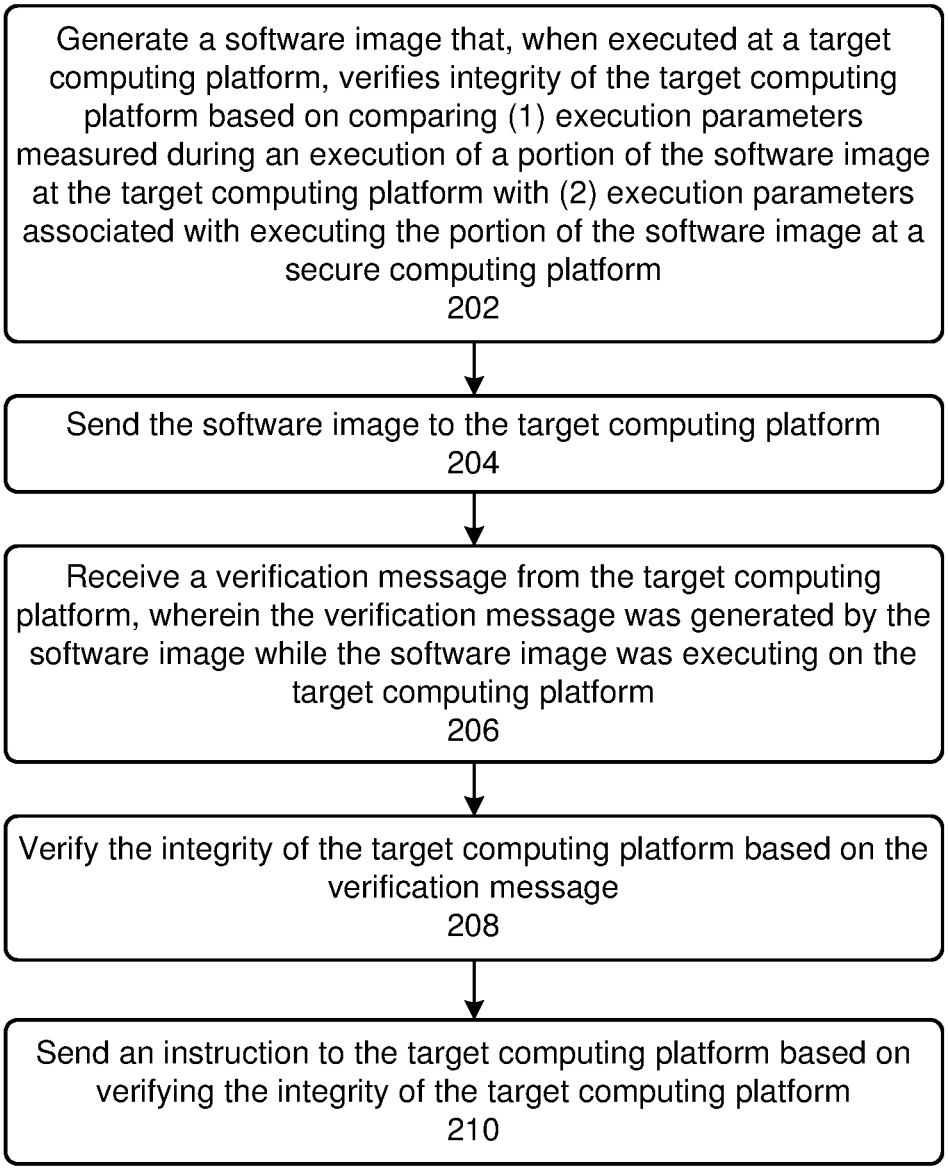
FIG. 2A illustrates a verification process that can be performed at a secure computing platform in accordance with some embodiments described herein.

FIG. 2A illustrates a verification process that can be performed at a secure computing platform in accordance with some embodiments described herein. The process can begin by generating a software image that, when executed at a target computing platform, verifies integrity of the target computing platform based on comparing (1) execution parameters measured during an execution of a portion of the software image at the target computing platform with (2) execution parameters associated with executing the portion of the software image at a secure computing platform (operation 202). The software image can then be sent to the target computing platform (operation 204). Next, a verification message can be received from the software image that is executing on the target computing platform (operation 206). The integrity of the target computing platform can then be verified based on the verification message (operation 208). Next, the process can send an instruction to the target computing platform based on verifying the integrity of the target computing platform (operation 210).

Figure 2B:
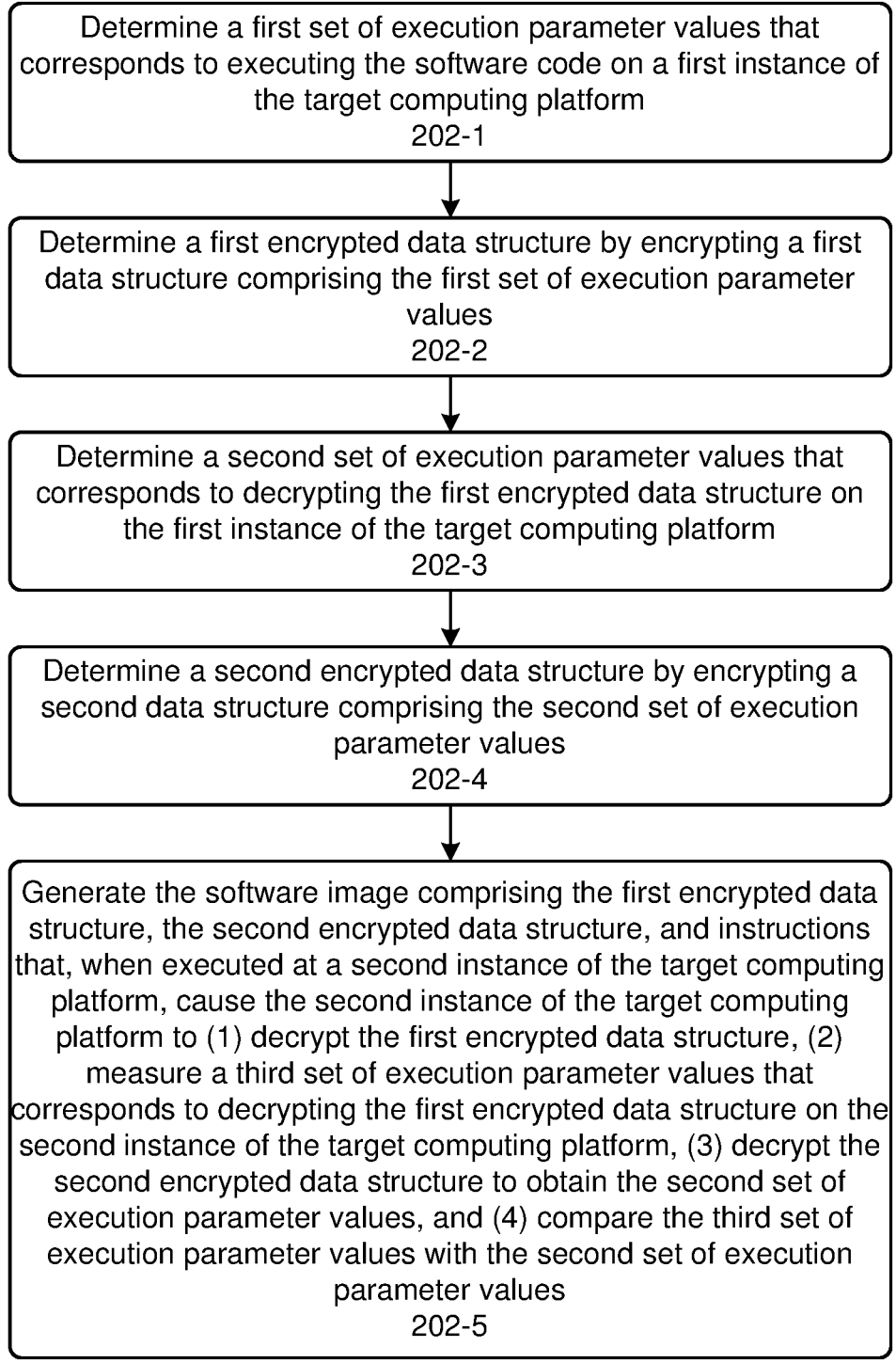
FIG. 2B illustrates a process for generating a software image in accordance with some embodiments described herein.

FIG. 2B illustrates a process for generating a software image in accordance with some embodiments described herein. The process can begin by determining a first set of execution parameter values that corresponds to executing the software code on a first instance of the target computing platform (operation 202-1). Next, a first encrypted data structure can be determined by encrypting a first data structure comprising the first set of execution parameter values (operation 202-2). A second set of execution parameter values can then be determined that corresponds to decrypting the first encrypted data structure on the first instance of the target computing platform (operation 202-3). Next, a second encrypted data structure can be determined by encrypting a second data structure comprising the second set of execution parameter values (operation 202-4). Finally, the process can generate the software image comprising the first encrypted data structure, the second encrypted data structure, and instructions that, when executed at a second instance of the target computing platform, cause the second instance of the target computing platform to (1) decrypt the first encrypted data structure, (2) measure a third set of execution parameter values that corresponds to decrypting the first encrypted data structure on the second instance of the target computing platform, (3) decrypt the second encrypted data structure to obtain the second set of execution parameter values, and (4) compare the third set of execution parameter values with the second set of execution parameter values (operation 202-5).

The specific software image that is created for a given target platform can depend on multiple factors. In particular, the set of execution parameter values that are used for verifying the target computing platform can depend on the threat level that is expected at the target computing platform. For example, if a low threat level is expected, then a single execution parameter value can be used. For example, at one or more points during code execution, a timestamp can be stored (which can be the system time or a time obtained via Secure NTP). The sequence of timestamps can then be used for verification purposes. On the other hand, if a high threat level is expected, then a larger number of interdependent execution parameter values can be used. Additionally, depending on the capabilities of the target computing platform and/or depending on the capabilities of the adversary, different sets of execution parameter values can be used.

Figure 2C:
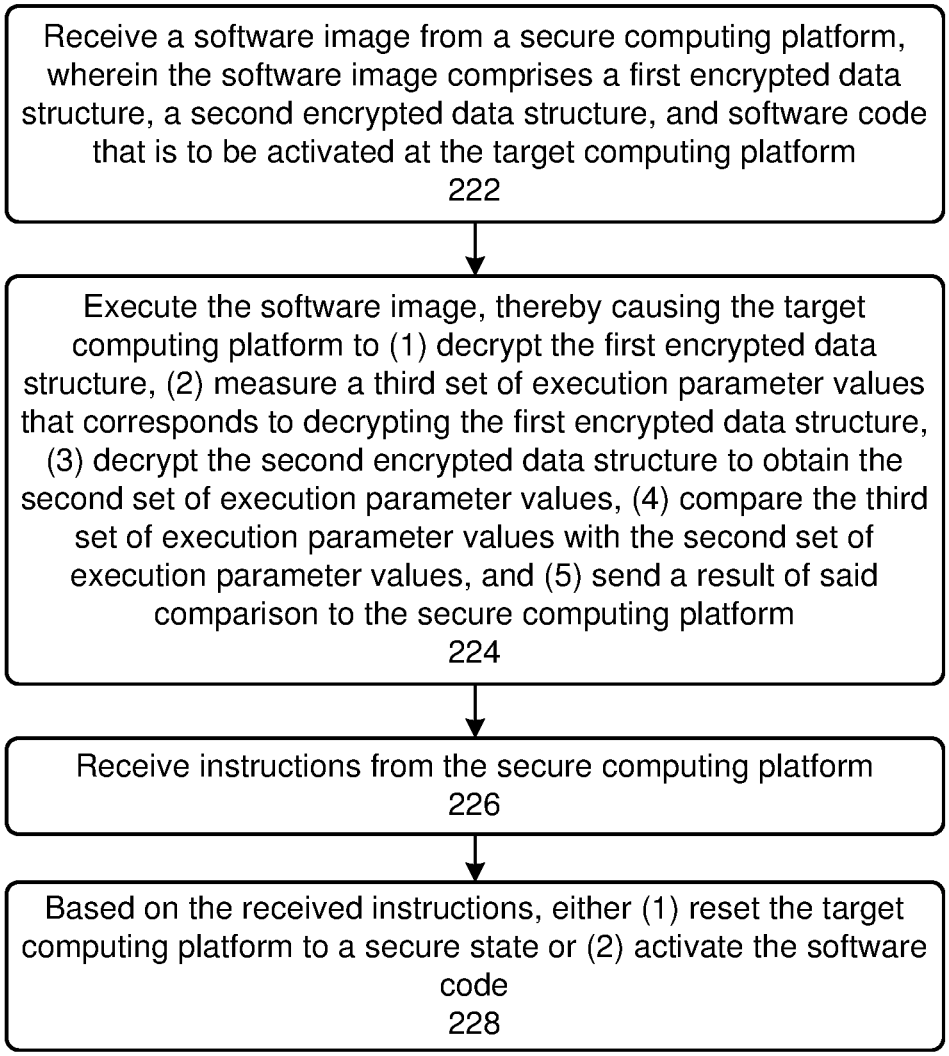
FIG. 2C illustrates a verification process that can be performed at a target computing platform in accordance with some embodiments described herein.

FIG. 2C illustrates a verification process that can be performed at a target computing platform in accordance with some embodiments described herein. The process can begin by receiving a software image from a secure computing platform, wherein the software image comprises a first encrypted data structure, a second encrypted data structure, and software code that is to be activated at the target computing platform (operation 222). Next, the target computing platform can execute the software image, thereby causing the target computing platform to (1) decrypt the first encrypted data structure, (2) measure a third set of execution parameter values that corresponds to decrypting the first encrypted data structure, (3) decrypt the second encrypted data structure to obtain the second set of execution parameter values, (4) compare the third set of execution parameter values with the second set of execution parameter values, and (5) send a result of said comparison to the secure computing platform (operation 224). The target computing platform can then receive instructions from the secure computing platform (operation 226). Based on the received instructions, the target computing platform can either (1) reset the target computing platform to a secure state or (2) activate the software code (operation 228).

Figure 2D:
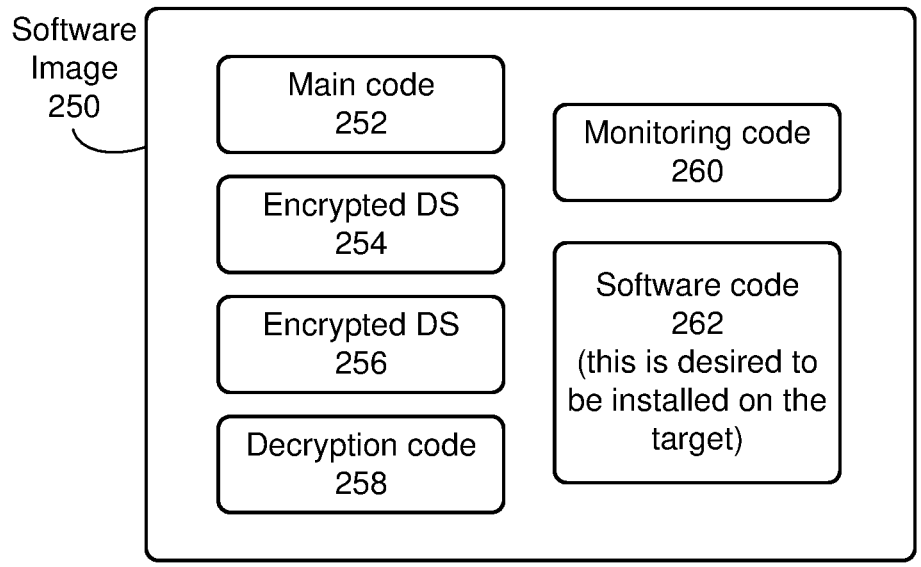
FIG. 2D illustrates components of a software image that can be used to verify the integrity of a target computing platform in accordance with some embodiments described herein.

FIG. 2D illustrates components of a software image that can be used to verify the integrity of a target computing platform in accordance with some embodiments described herein. The components shown in FIG. 2D are for illustration purposes only, and are not intended to limit the scope of the disclosed embodiments. Specifically, it will be apparent to persons having ordinary skill in the art that a software image can include greater or fewer components than the ones shown in FIG. 2D. Software image 250 can comprise main code 252, encrypted data structures 254 and 256, decryption code 258, monitoring code 260, and software code 262 that is desired to be installed on the target computing platform. When a target computing platform receives software image 250, it can begin by executing main code 252. Main code 252 can include instructions for (1) performing verification of the target computing platform, and upon successful verification, (2) installing software code 262 on the target computing platform. Encrypted data structure 254 can include a first set of execution parameter values that corresponds to executing the software code on a secure instance of the target computing platform. Encrypted data structure 256 can include a second set of execution parameter values that corresponds to decrypting encrypted data structure 254 on the secure instance of the target computing platform. Decryption code 258 can be used to decrypt encrypted data structures 254 and 256. Monitoring code 260 can be used to monitor the execution of software image 250, and to determine execution parameter values associated with the execution of one or more portions of software image 250.

When main code 252 is executed by a target computing platform, main code 252 can execute instructions in decryption code 258 to decrypt encrypted data structure 254. While decryption code 258 is decrypting encrypted data structure 254, monitoring code 260 can determine execution parameter values associated with the execution of decryption code 258 (e.g., decryption code 258 can execute instructions from monitoring code 260 during decryption so that monitoring code 260 can determine execution parameter values during the decryption process). Note that a third set of execution parameter values that corresponds to decrypting the first encrypted data structure on the target computing platform are obtained when decryption code 258 completes decrypting encrypted data structure 254. Next, main code 252 can execute instructions in decryption code 258 to decrypt encrypted data structure 256 to obtain the second set of execution parameter values that corresponds to decrypting encrypted data structure 254 on the secure instance of the target computing platform. Main code 252 can then compare the third set of execution parameter values with the second set of execution parameter values. If the third set of execution parameter values matches (within a given tolerance range) with the second set of execution parameter values, then main code 252 can conclude that the target computing platform is intact, and proceed with communicating with the secure computing platform for final verification, and for receiving instructions to activate software code 262 on the target computing platform. If main code 252 receives instructions to activate software code 262 from the secure computing platform, then main code 252 can verify the authenticity of the instructions (any known technique for verifying authenticity can be used here). Once authenticated, main code 252 can activate software code 262. For example, main code 252 can hand execution control over to software code 262.

Figure 3:
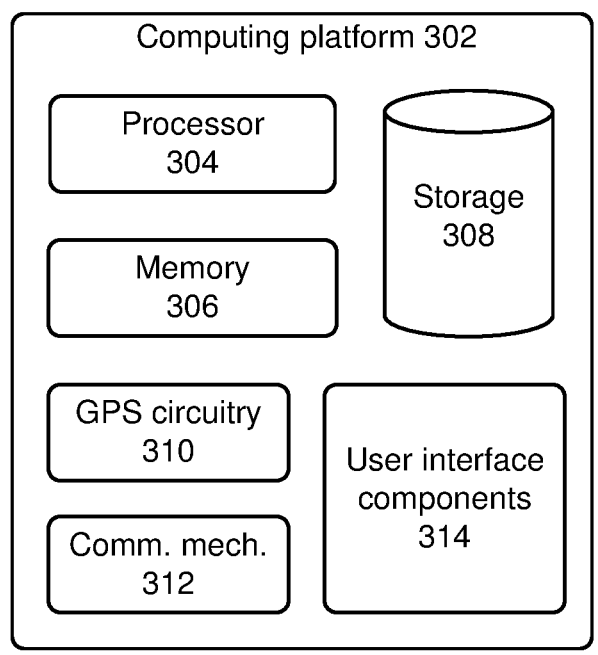
FIG. 3 illustrates a computing platform in accordance with some embodiments described herein.

FIG. 3 illustrates a computing platform in accordance with some embodiments described herein. Computing platform 302 comprises processor 304, memory 306 (e.g., a volatile random access memory, non-volatile random access memory, etc.), and storage 308 (e.g., flash memory, disk drive, etc.). Storage 308 can generally store code (BIOS, a hypervisor, an OS, software applications) and/or data. Computing platform 302 can also include GPS circuitry 310 to receive GPS signals and to determine a geographic location of computing platform 302 based on the received GPS signals. User interface components 314 can generally include any hardware or software components (e.g., keyboard, mouse, display, touchscreen, window manager, etc.) that are used for interacting with a user. Communication mechanism 312 can generally include any hardware or software components (e.g., networking circuitry and ports, serial communication circuitry and ports, networking software, wireless communication circuitry, etc.) that can be used by computing platform 302 to communicate with other devices. The components in computing platform 302 can communicate with one another by using a bus, a backplane, a switching fabric, and/or any other communication circuitry. The number and type of components shown in FIG. 3 are for illustration purposes only and are not intended to limit the scope of the embodiments disclosed herein.

When computing platform 302 corresponds to a secure computing platform, a software application stored in storage 308 can be executed by processor 304. This software application can then generate a software image that can be used to verify the integrity of a target computing platform. Once generated, the software image can be sent to the target computing platform via communication mechanism 312.

When computing platform 302 corresponds to a target computing platform, a software image can be received from a secure computing platform via communication mechanism 312. Next, the software image (which is now stored either in memory 306 and/or storage 308) can be executed by processor 304. The executing software image can then determine the integrity of computing platform 302.

CPU Implementation

A CPU typically creates a logical sequence of states arising out of the action of the CPU's instructions upon the content of registers, memory, and other storage locations contained within the physical boundaries of its hardware. Adversaries may seek to infiltrate false content, either into the instruction stream or the storage and memory locations used by the processor, thus potentially enabling assumption of control over the operation of the CPU by the adversary, production of meretricious results from corrupted CPU operations, or other sabotage of the intended behavior of the system in question.

It might be possible to forestall such intervention by encoding the instruction stream with, for example, an encryption procedure known only to the legitimate operator of the CPU, which cannot be interfered with in the absence of knowledge of the encryption details (keys, etc.) used to create the correct stream. However, this imposes a considerable burden on the CPU architecture both in terms of its design complexity and in terms of its cost and energy demands. It also greatly circumscribes the markets and applications into which such a processor might be introduced, because of its reduced generality. Some embodiments described herein accomplish the same security objectives without incurring the attendant costs and other disadvantages.

The CPU architecture described herein incorporates in hardware the above-described processes and mechanisms described in reference to FIGS. 1-3. During operation, the CPU integrates the execution parameters associated with the protection mechanism with, for instance, the execution stream of the processor's fetch and decode and program counter units. Each advance of the program counter has the effect of updating storage locations (for instance, registers) within the CPU that record the new execution parameters at that stage in the progression through the code stream. These may include, but need not be limited to, cycle counts, instruction counts, memory addresses, cache hits and misses, scoreboards, interrupt processing, DMA control features, thread execution and management, speculative execution accounting, and the like.

Circuit structures that implement processes and mechanisms described in this disclosure may be incorporated in or added to an existing processor architecture and instruction set already present in the market. Thus, a manufacturer of such CPU types as the x86, the MIPS, the ARM, the Microchip PIC, the Atmel/Microchip AVR, the Tensilica Xtensa, the ARC, the RISC-V, and the like, by way of example, might elect to incorporate an embodiment described herein in instances of the architecture of such an existing design in order to imbue it with the security capability afforded by embodiments described herein.

Thus, any such processor may enjoy the security advantages described herein, and may enter into secure structures implementing the processes and mechanisms described herein in other computing architectures allowing cooperation in secure confederations with any other processors so equipped, irrespective of instruction set architecture (ISA). The processes and mechanisms described herein may be manifested in an abstracted API (application programming interface) unifying a common security environment among cooperating entities.

The candidate CPU architecture to be provisioned with an embodiment of the processes and mechanisms described herein will, by way of example, be afforded the following facilities: a mechanism for securely obtaining an accurate and repeatable measure of the exact and relative time, such as Secure NTP or the like; secure storage locations within the physical compass of the CPU's hardware instantiation for accepting the values of the measured and calculated execution parameters such as cycle and instruction counts and elapsed time, as necessary; unique identification of the CPU; additional or modified instructions suitable for specialized processing of the time and execution parameter values as required; and so on.

The specific realization of these features will depend upon the characteristics of the candidate processor; most processor families embrace extensions by original equipment manufacturers (OEMs) or specialty customers, for example, which may be exploited to this end.

Of particular importance is the uniformity and consistency of the abstracted representation of the API, so that both the overall system security and the parametric behavior of the embodiments in different architectures and in different instantiations (varying, for instance, in how clocks and oscillators are realized, or in treatment of threading) are uniform with respect to how they are manifested at the interface; in this way coordinated ensembles of many devices of heterogeneous type may be integrated in a consistent uniform system design based on the API.

An embodiment thus comprises the implementation of the processes and mechanisms described in this disclosure within the hardware architecture of candidate central processing units already on the market (as well as the possibility of designing and developing novel CPU architectures expressly intended to offer optimized or expanded support for the processes and mechanisms described in this disclosure, as well as new capabilities). The implementation may include (without necessarily being limited to) registers, counters, clocks, oscillators, latches, input/output facilities, shift registers, encryption/decryption facilities, error correction facilities, switches, buses, and intermediate storage locations such as may be required by particular versions implementing the processes and mechanisms described herein.

Figure 4:
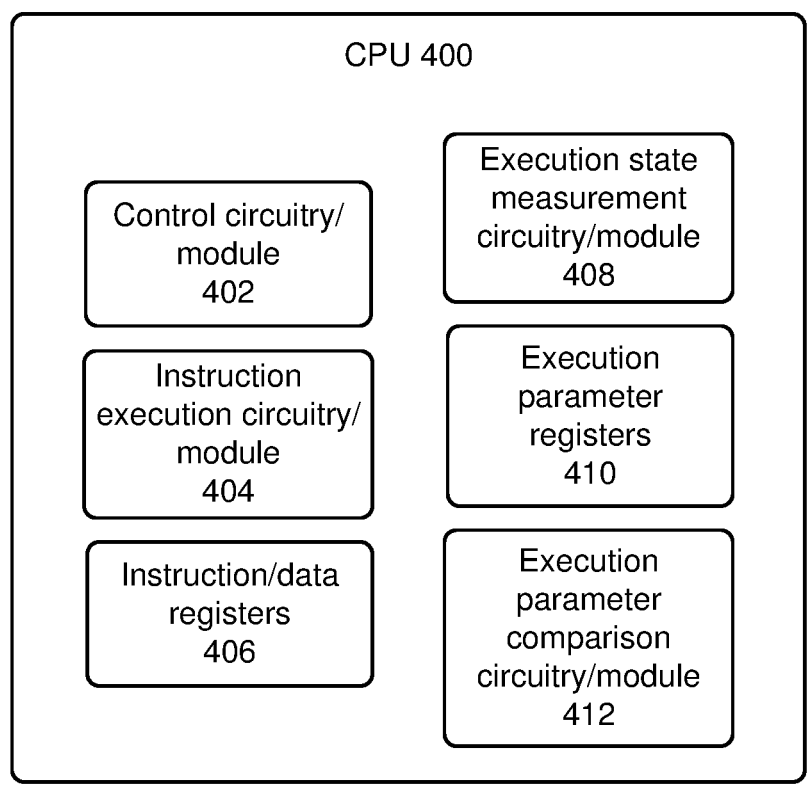
FIG. 4 illustrates a secure CPU in accordance with some embodiments described herein.

FIG. 4 illustrates a secure CPU in accordance with some embodiments described herein. The number and type of components shown in FIG. 4 are for illustration purposes only and are not intended to limit the scope of the embodiments disclosed herein. CPU 400 can include control circuitry/module 402, instruction execution circuitry/module 404, and instruction/data registers 406. Control circuitry/module 402 can (1) fetch instructions of a software image from a memory, (2) decode the instructions, and (3) provide control signals to instruction execution circuitry/module 404 based on the decoded instructions. Instruction execution circuitry/module 404 can then execute the instructions, thereby modifying an execution state of the computing platform instance. Instruction/data registers 406 can be used by control circuitry/module 402 to store instructions, and by instruction execution circuitry/module 404 to store input, output, or intermediate values.

CPU 400 can include execution state measurement circuitry/module 408 to measure a set of execution parameter values during an execution of a portion of the software image, wherein the set of execution parameter values represents a sequence of execution states that the target instance of the computing platform passes through while executing the portion of the software image. The set of execution parameter values may be stored in memory, or in instruction/data registers 406, or in a set of special registers reserved for storing the set of execution parameter values, such as execution parameter registers 410.

CPU 400 can also include execution parameter comparison circuitry/module 412 to compare (1) a first set of execution parameter values (which represents a sequence of execution states that the target instance of the computing platform passes through while executing the portion of the software image) with (2) a second set of execution parameter values associated with executing the portion of the software image at a secure instance of the computing platform (wherein the second set of execution parameter values represents a second sequence of execution states that the secure instance of the computing platform is expected to pass through while executing the portion of the software image). In some embodiments, instruction execution circuitry/module 404 may be used for comparing the first set of execution parameter values with the second set of execution parameter values.

Hypervisor Implementation

Embodiments disclosed in this subsection pertain to computer systems, and specifically to security features capable of protecting data, instructions, and other contents of such systems.

Security in computer systems must apply to all layers of the system architecture in question. For example, a typical computer system is built up of low level semiconductors implementing a CPU or Graphics Processing Unit (GPU), intermediate layers comprising hard-coded instructions and modifiable instructions and data in flash memory or EEPROMs, low level software drivers supporting input/output operations, operating system functions, and application level functions.

A common computer security problem is that although one particular level of the system architecture is deemed secure, other levels may harbor vulnerabilities or hostile facilities capable of subverting the secure and predictable operation of the system.

It is therefore vital that secure system architectures incorporate security measures at every level, which complement and reinforce one another to create an impregnable whole. This disclosure provides methods and apparatuses for deploying a spatiotemporal reconnaissance, authentication, and mitigation facility capable of instantiating such measures.

An important feature is that the hypervisor must not allow for the undetected usurpation of its functions by an adversarial process. Hypervisors are of many types; some are said to rest "on the metal." This means that the actual physical transistors implementing the instruction stream for the hypervisor are physically incorporated in the CPU or GPU (for instance) die, meaning that they are not emulated or virtualized, as this would render them more subject to attack, infiltration, or subversion. Embodiments described in this disclosure (e.g., see FIGS. 1-4) provide systems and techniques for preventing even attacks that attempt to take over a hypervisor from succeeding.

Some embodiments extend and amplify these architectural and methodological precepts so that arbitrary collections of heterogeneous devices may be secured and managed according to the techniques taught in this disclosure. Specifically, some embodiments provide methods and systems for building and deploying a hypervisor whose design and properties allow it to control and manage securely a system environment within which the spatiotemporal model previously referred to is supported.

Specifically, suppose a computing device is communicating with a remote secure server. The server is constructed to prepare, deploy, and monitor spatiotemporal images of the kind taught in this disclosure. The operation of the mechanism will be greatly facilitated, and its security greatly enhanced, if the server is able to operate based on the assumption that the recipient system is designed specifically to accept, process, interact with, and appropriately and securely manage state space objects that are expected to conform to the security techniques and systems mentioned in this disclosure. In the event that an anomaly is detected or suspected, the hypervisor in the receiving device is provided with behaviors that 1) inoculate the device to prevent compromise, 2) notify the server(s), and 3) invoke prophylactic measures to correct the effects of penetration.

Among the behaviors to be carried out by the device's hypervisor is validation of the integrity of its time base. Many facilities furnishing this function are well known; an example would be Secure NTP. The hypervisor must implement processes that confirm that the time provided is not compromised by an attacker through mobilization of multiple sites, appeal to the host server, voting protocols, and other well-known mechanisms.

The functions of the device's hypervisor include (but are not limited to) 1) maintaining a map of the address space(s) resident on the device, 2) ensuring that the address spaces conform to the expectations recorded in the server, 3) formulating, transmitting, and authenticating spatiotemporally encoded messages to and from the server, 4) maintaining a secure API between itself and the resident operating system and its resources, and 5) conducting audit and mitigation operations in support of compiling statistics and behavioral profiles characterizing the state spaces and processes resident upon the device.

An important function of the hypervisor is to maintain and calibrate an instance of a secure time reference. This might, by way of example, include an instantiation of Secure NTP; the hypervisor would implement means of independently testing and verifying the correctness, precision, and integrity of the timing reports offered by the service (such as Secure NTP). Furthermore, the hypervisor would be capable of confirming that its timing determinations are in accord with those independently arrived at on a remote secure server or peer, allowing a mesh or network to affirm that the time base has not been compromised.

In addition, the hypervisor must be capable of confirming that it is indeed operating "on the metal," in other words, that it has not been "spoofed" so as to appear operating "on the metal" when in fact a malicious interloper has virtualized it and thereby taken control of its operation. Methods for verifying operation "on the metal" to assure that a processor instance is not a virtual doppelganger are well known to those skilled in the art.

The hypervisor may optionally be provided with the capability to gather an inventory of the hardware and/or software resources present on the system or device onto which it is installed, and to securely transmit the inventory to a host server possessing the appropriate protocol support or to a peer in a mesh network of comparable secure devices.

In sum, the hypervisor on the metal is an instantiation of the spatiotemporal model taught in FIGS. 1-4, which is impervious to penetration by virtue of a) its implementation "on the metal" and b) its self-referential execution of said spatiotemporal security model.

The secure hypervisor described herein may assume the responsibility for governing the operation and security of system software (operating system, drivers, firmware, etc.) implementing a secure API (application programming interface) to it, thereby affording all of the hypervisor's security and integrity features to the supported system software with which it has an interface.

A further duty of the hypervisor can be to accumulate and report securely to a host or secure peer information regarding the environs of its secure environment, including the number, health, and attributes of peer neighbors or near neighbors with which it is in communication. These data may be reported back periodically to a secure server governing a larger aggregation of participating devices or systems implementing the appropriate protocol(s).

Metacompiler

Supposing a target environment as described in reference to FIGS. 1-4, the following paragraphs provide a method and apparatus for creating secure execution images compatible with such environments, including with respect to their security.

Constructing a software image that is capable of verifying a target instance of a computing platform (as described in this disclosure) may presuppose detailed knowledge and understanding on the part of the developer of the target environment in which the code will be validated and executed. In particular the cycle counts, instruction sizes and definitions, memory utilization, and other features peculiar to particular processors or processor families must be taken into account when formulating an image for eventual execution in the candidate target space.

Given that there are thousands of computer types and models, all differing with respect to these parameters, it is necessary that a software tool as described herein be employed to correctly formulate an image consistent both with the design intention of the developer and the requirements for validation of the security mechanisms described in the patent referred to.

The metacompiler will behave as follows: a table or tables containing the values for all of the parameters relevant to the use case, application, and processor family will be read in. As each instruction or datum of the design is read in, the table(s) is/are consulted and the pertinent values defining the behavior of the reference processor in the context are derived and added to the image being constructed. As the image is built, the metacompiler will calculate the necessary descriptors characterizing the behavior and output of the image when it is eventually executed in the target space and append these to the image in the appropriate format for the use in question.

Worm/App Implementation

Suppose a network of systems and/or devices exists that implements the processes and mechanisms described in reference to FIGS. 1-4. Given a code component conforming to the security model requirements described in this disclosure, in order to test and verify the integrity of a code stream in a defined segment of an address space, a module (comprising code and the encrypted parameters defining the space-time behaviors of the code) is introduced into the code path such that it will be encountered at and only at a predetermined time (and a predetermined constellation of points in the state space of the encoded function). Since the interaction between the subject code stream and the module is mediated entirely by the controlling server, any attempt to subvert or intervene in the execution, composition, or behavior of the stream, at that point or at any proximate point before or after the dictates of its designated parameters, will result in a failure to validate, either because the parameters returned will be inconsistent with the state of the module, or because the decryption of the parameters expected will fail.

Some embodiments create a code element able to traverse networks autonomously, and able to carry out instructions at designated places and times on behalf of the controlling system. In so doing it prosecutes both reconnaissance and interrogation functions, by means of alerts and triggers, and also implements active interventions and ameliorations in the target space on behalf of the controlling system.

Using Multiple Dimensions

Some embodiments described herein identify a security procedure (method and apparatus) which secures data in a computer or communication system by means of encoding along two axes or dimensions. For example, in some embodiments described herein, the dimensions along which the data are encoded are, respectively, time and number. The representation in the time dimension, and the representation in the number dimension, may be viewed as being self-referential, in that certain aspects of the temporal encoding depend upon the numerical (cryptographic) encoding, and certain aspects of the numerical encoding depend independently upon the temporal encoding.

The self-referential property of the data representation renders it impervious to malicious interference by an attacker, because one dimension cannot be perturbed without disrupting the representation of the data in the other dimension. To these two dimensions (or axes) of representation or encoding, some embodiments may add a third axis or dimension, namely that of the address space (or spaces) within which the data at issue are represented.

This address space may be taken to be a linear sequence of locations within an abstract domain in which data items enjoy a one-to-one relationship with loci in the space. The space is given material realization in memory devices examples of which are described in this disclosure.

The different axes or dimensions may enter into specific defined relationships with one another for purposes of securely encoding their content in a self-referential and therefore manipulation-resistant structure. Likewise, more than two axes or dimensions (e.g., three dimensions) may also enter into specific defined relationships together for purposes of securely encoding their content in a self-referential and therefore manipulation-resistant structure. For example, the encodings in the number space, in the temporal dimension, and in the address domain, may each simultaneously refer to one another in an entangled fashion such that none may be interfered with without disturbing in a detectable manner the encodings of the others.

Some embodiments described herein lock a representation of an address space (which might be physical or logical) to other axes or dimensions (e.g., number and time), such that the three axes thus delineated form a single coding hyper-space within which self-referential triplets identify immutable loci. Some embodiments described herein may render mutually interdependent each of three dimensions or axes securing a body of data in a computer system. This means that any alteration or disruption to the content covered by any of the three dimensions must correspondingly disrupt the other two.

This is so because the encoding of each axis draws upon metrics also applied in the other axes and retained as an encrypted meta-object by the system, available for inspection or consultation upon demand of the operating system. This further means that the independent protections afforded the data attributes of one dimension or axis extend by proxy to each of the other dimensions or axes with which it is convolved by means of the methods described herein.

This convolution may be achieved in any of a number of ways. For example if the timing of the system were affected by an attacker's actions, the dependency of the address space on time would be corrupted and detected. If the cryptographic code space were affected, the interpretation of the coded data space would immediately be altered and could therefore be detected, and so on.

For example, the address space representation might be altered maliciously by an attacker: this could happen in the event an attempt was made to introduce subversive machine instructions or data in the execution environment. Some embodiments described herein can counter such attacks by incorporating an encoding of the addresses used in the execution environment. An example of such an encoding is afforded by address space layout randomization (ASLR), a technique used to obfuscate the positions of memory blocks within address spaces (which renders difficult the reverse engineering of computer code in a given address space). Other address space manipulation techniques may also be employed, which include, but are not limited to, address space manipulation techniques that are available in the application, operating system, and utility program contexts.

In this manner, some embodiments described herein integrate address space representation with other dimensions, e.g., time and cryptographic (or numerical) encoding. Some embodiments described herein simultaneously combine the encoding of the temporal, cryptographic, and address spaces in a single meta-object whose integrity is contingent upon the representations in and of all three dimensions at once.

An attacker is presented with the near impossibility of undetectably decoding and modifying each of the dimensions' data without betraying the corruption thus incurred within the other spaces. Thus, the three axes or dimensions are mutually interdependent through self-reference. This means systems may run secure in the knowledge that their operating environments are inviolate in each of the dimensions critically necessary for secure, uncorrupted operation within the subject dimensions (time, number, address).

Embodiments described herein provide for protections over any class of address space employed within the system; these might include (though not be limited to) random access memory, rotating mass storage, flash memory, cache memory, or optical storage etc. These spaces might also, for instance, be operated as compound, hybrid memory types according to the system's requirements, and managed in accordance with the methods described herein.

Figure 5:
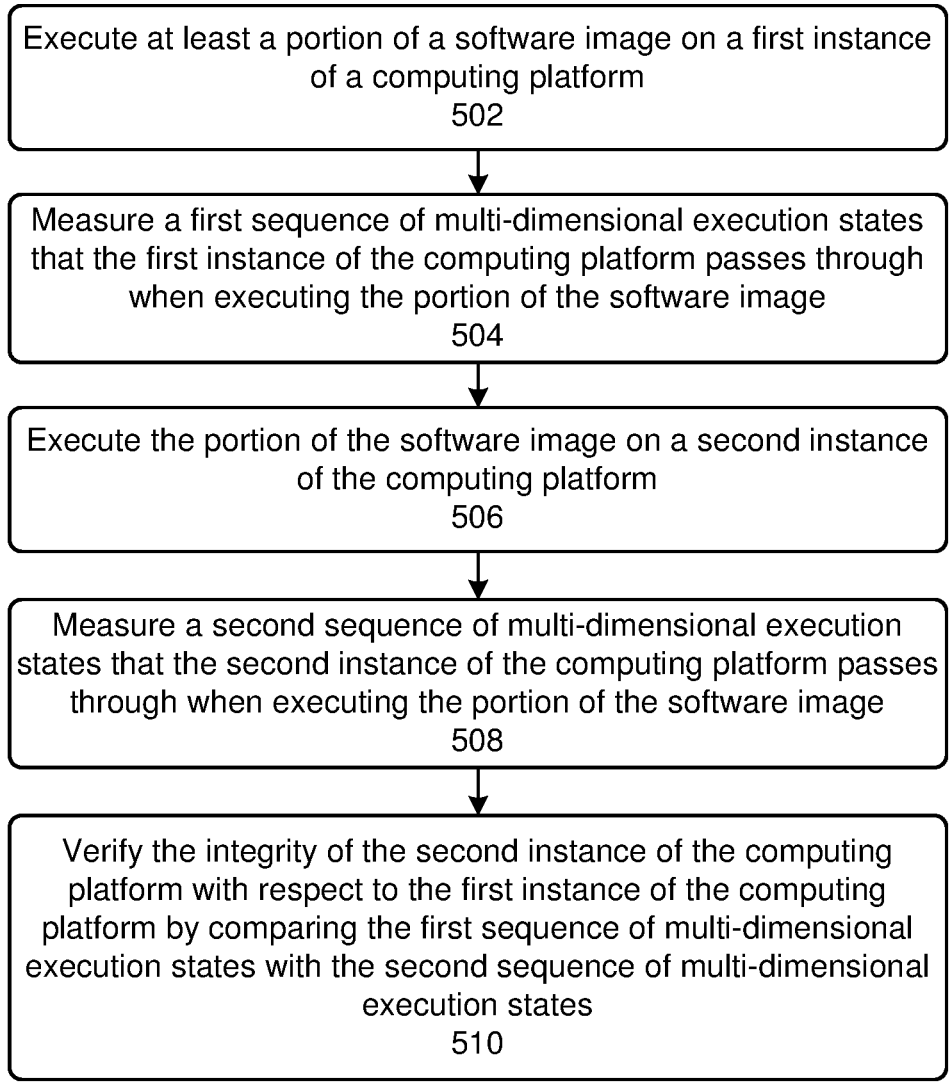
FIG. 5 illustrates a process to verify a second instance of a computing platform with respect to a first instance of the computing platform in accordance with some embodiments described herein.

FIG. 5 illustrates a process to verify a second instance of a computing platform with respect to a first instance of the computing platform in accordance with some embodiments described herein.

At least a portion of a software image may be executed on a first instance of a computing platform (operation 502). A first sequence of multi-dimensional execution states may be measured that the first instance of the computing platform passes through when executing the portion of the software image (operation 504). The portion of the software image may be executed on a second instance of the computing platform (operation 506). A second sequence of multi-dimensional execution states may be measured that the second instance of the computing platform passes through when executing the portion of the software image (operation 508). The integrity of the second instance of the computing platform may be verified with respect to the first instance of the computing platform by comparing the first sequence of multi-dimensional execution states with the second sequence of multi-dimensional execution states (operation 510).

In some embodiments described herein, each multi-dimensional execution state may include self-referential measurements along a number dimension, a time dimension, and a space dimension. Examples of measurements along a number dimension may include, but are not limited to, intermediate numerical values that are generated by a computation (e.g., a cryptographic computation). Examples of measurements along a time dimension may include, but are not limited to, elapsed wall-clock time, a count of clock cycles, and a count of CPU instructions that have been executed so far. Examples of measurements along a space dimension may include, but are not limited to, memory addresses or memory address ranges of instructions that were being executed when the measurement was taken and/or memory addresses or memory address ranges of data that were being accessed when the measurement was taken.

In some embodiments described herein, the first sequence of multi-dimensional execution states may be stored in the software image. For example, referring to FIG. 2D, the first sequence of multi-dimensional execution states may be stored in encrypted data structure 254, which is part of software image 250. In some embodiments described herein, an action may be performed at the second instance of the computing platform based on said verifying the integrity of the second instance of the computing platform. Specifically, the action may include, but is not limited to, resetting the second instance of the computing platform to a secure state and activating software code embedded in the software image.

Acquiring, Evaluating, and Acting upon Security and Integrity Data

Suppose a network of systems and/or devices exists that implements the processes and mechanisms described in this disclosure. This subsection describes methods and apparatuses for communicating with, managing and controlling, and making decisions about such aggregations.

Among the central concerns in networks of systems and devices of the type referred to is detection and application of appropriate responses to intrusion and compromise attempts and events. An embodiment describes an "engine" designed for this purpose. This engine must acquire and respond to stimuli deriving from the subject network of devices and systems in real time, and mobilize resources adequate to intercept and neutralize such adversarial attacks.

An embodiment incorporates the following functions and capabilities: 1) to acquire in real time or near real time reports from remote target devices and systems on their status and integrity; 2) to place such reports within an analytic framework and to formulate suitable responses in near real time; and 3) to transmit and verify the execution of such responses on the part(s) of the subject target systems and/or devices.

It is assumed here that the engine in question is in communication with one or more target devices or systems, which are equipped to provide near real time reports of their integrity. The engine must accept and validate these reports; its primary function thereafter is to evaluate larger ensembles of reports for evidence of intrusion attempts, infection by malicious entities, or infiltration by concealed code or alien objects with adversarial origins.

The engine in these embodiments accepts input from targets, and places the data points thus obtained in data structures suitable for evaluation by statistical and pattern recognition techniques including but not limited to neural nets implementing crossover and backpropagation, and classifiers including but not limited to cluster analysis, correlation and regression, factor analysis, and so on. In general such methods are well known, and are often referred to as "artificial intelligence" and "deep learning" among other descriptors. Their purpose in the present context is to form representations of the patterns typical of nominal and pathological operation of the ensembles of systems and devices being scrutinized.

It is assumed that the real time data recording and reporting capabilities of the hypervisors or other system facilities operating in the target(s) conform to the expectations and requirements of the engine in the controlling or peer system or device, which might be a participant in a mesh such as is commonly found in the Internet of Things, for example. Moreover, the role defining the relationship between two participants in such a mesh or network may be reversed as needed, from target to server or recipient engine, for instance.

Each reporting entity will furnish data on the timing and state space measurement procedures it has executed, according to the methods and systems referred to above. The engine will apply pattern recognition, statistical measures, and learning algorithms among others to these data in order to arrive at decisions regarding the need for action and determinations of which actions are appropriate.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   executing at least a portion of a software image on a first instance of a computing platform;
   measuring a first sequence of multi-dimensional execution states that the first instance of the computing platform passes through when executing the portion of the software image;
   executing the portion of the software image on a second instance of the computing platform;
   measuring a second sequence of multi-dimensional execution states that the second instance of the computing platform passes through when executing the portion of the software image; and
   verifying the integrity of the second instance of the computing platform with respect to the first instance of the computing platform by comparing the first sequence of multi-dimensional execution states with the second sequence of multi-dimensional execution states.

2. The method of claim 1, wherein each multi-dimensional execution state comprises self-referential measurements along a number dimension, a time dimension, and a space dimension.

3. The method of claim 1, further comprising storing the first sequence of multi-dimensional execution states in the software image.

4. The method of claim 1, further comprising performing an action at the second instance of the computing platform based on said verifying the integrity of the second instance of the computing platform.

5. The method of claim 4, wherein the action comprises resetting the second instance of the computing platform to a secure state.

6. The method of claim 4, the action comprises activating software code embedded in the software image.

7. A non-transitory computer-readable storage medium storing instructions that, when executed by a computer, cause the computer to:
   execute at least a portion of a software image on a first instance of a computing platform;
   measure a first sequence of multi-dimensional execution states that the first instance of the computing platform passes through when executing the portion of the software image;
   execute the portion of the software image on a second instance of the computing platform;
   measure a second sequence of multi-dimensional execution states that the second instance of the computing platform passes through when executing the portion of the software image; and
   verify the integrity of the second instance of the computing platform with respect to the first instance of the computing platform by comparing the first sequence of multi-dimensional execution states with the second sequence of multi-dimensional execution states.

8. The non-transitory computer-readable storage medium of claim 7, wherein each multi-dimensional execution state comprises self-referential measurements along a number dimension, a time dimension, and a space dimension.

9. The non-transitory computer-readable storage medium of claim 7, wherein the instructions, when executed by the computer, cause the computer to store the first sequence of multi-dimensional execution states in the software image.

10. The non-transitory computer-readable storage medium of claim 7, wherein the instructions, when executed by the computer, cause the computer to perform an action at the second instance of the computing platform based on said verifying the integrity of the second instance of the computing platform.

11. The non-transitory computer-readable storage medium of claim 10, wherein the action comprises resetting the second instance of the computing platform to a secure state.

12. The non-transitory computer-readable storage medium of claim 10, the action comprises activating software code embedded in the software image.

13. An apparatus, comprising:
    a processor; and
    a non-transitory storage medium storing instructions that, when executed by the processor, cause the apparatus to:
      execute at least a portion of a software image on a first instance of a computing platform;
      measure a first sequence of multi-dimensional execution states that the first instance of the computing platform passes through when executing the portion of the software image;
      execute the portion of the software image on a second instance of the computing platform;
      measure a second sequence of multi-dimensional execution states that the second instance of the computing platform passes through when executing the portion of the software image; and
      verify the integrity of the second instance of the computing platform with respect to the first instance of the computing platform by comparing the first sequence of multi-dimensional execution states with the second sequence of multi-dimensional execution states.

14. The apparatus of claim 13, wherein each multi-dimensional execution state comprises self-referential measurements along a number dimension, a time dimension, and a space dimension.

15. The apparatus of claim 13, wherein the instructions, when executed by the processor, cause the apparatus to store the first sequence of multi-dimensional execution states in the software image.

16. The apparatus of claim 13, wherein the instructions, when executed by the processor, cause the apparatus to perform an action at the second instance of the computing platform based on said verifying the integrity of the second instance of the computing platform.

17. The apparatus of claim 16, wherein the action comprises resetting the second instance of the computing platform to a secure state.

18. The apparatus of claim 16, the action comprises activating software code embedded in the software image.

* * * * *